Figure 1:
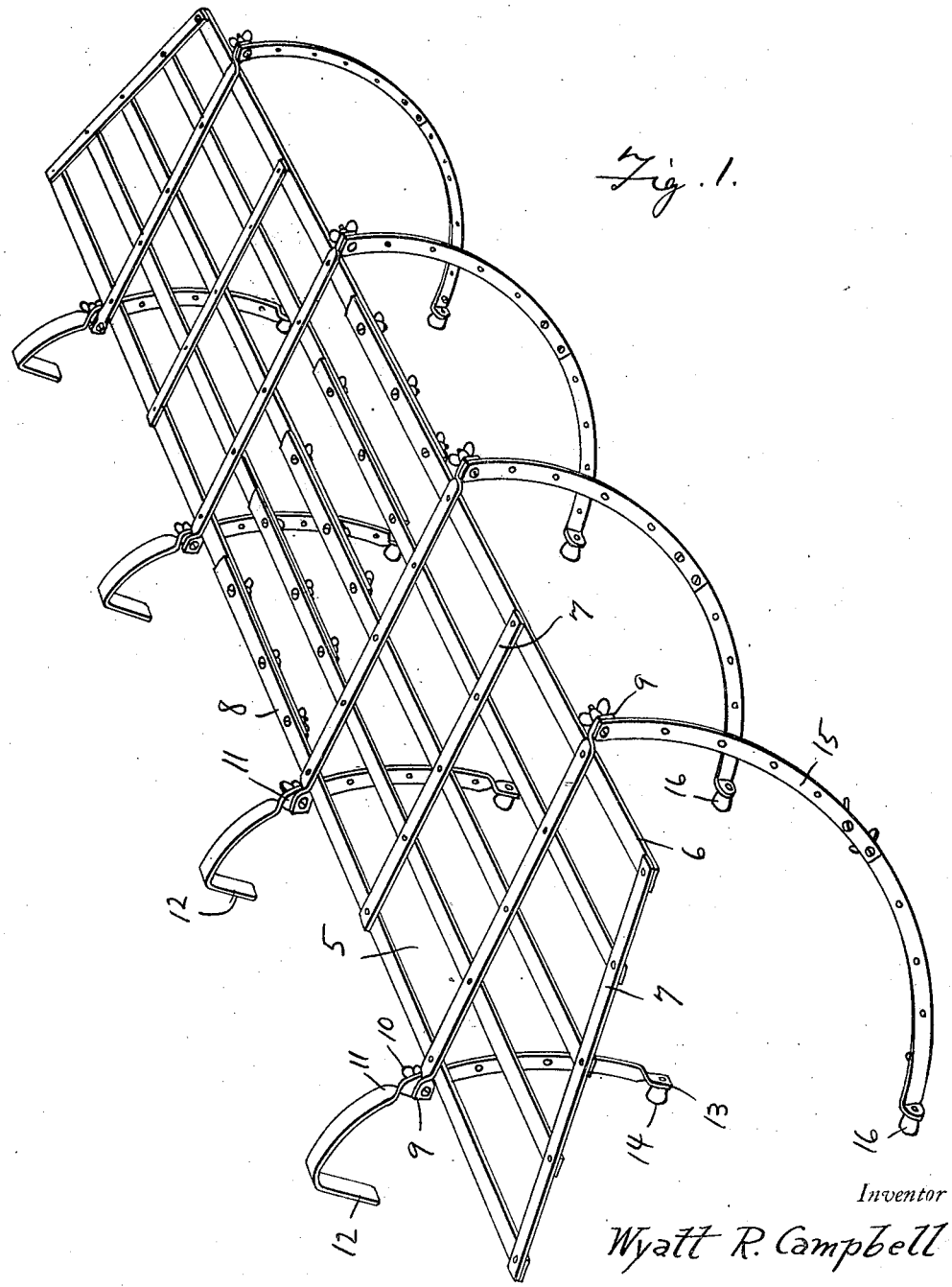

Sept. 4, 1928.  1,683,526
W. R. CAMPBELL
FLOWER DISPLAYING DEVICE FOR COFFIN LIDS
Filed Oct. 27, 1927  2 Sheets-Sheet 1

Inventor
Wyatt R. Campbell
By Clarence A. O'Brien
Attorney

Sept. 4, 1928.
W. R. CAMPBELL
1,683,526
FLOWER DISPLAYING DEVICE FOR COFFIN LIDS
Filed Oct. 27, 1927
2 Sheets-Sheet 2
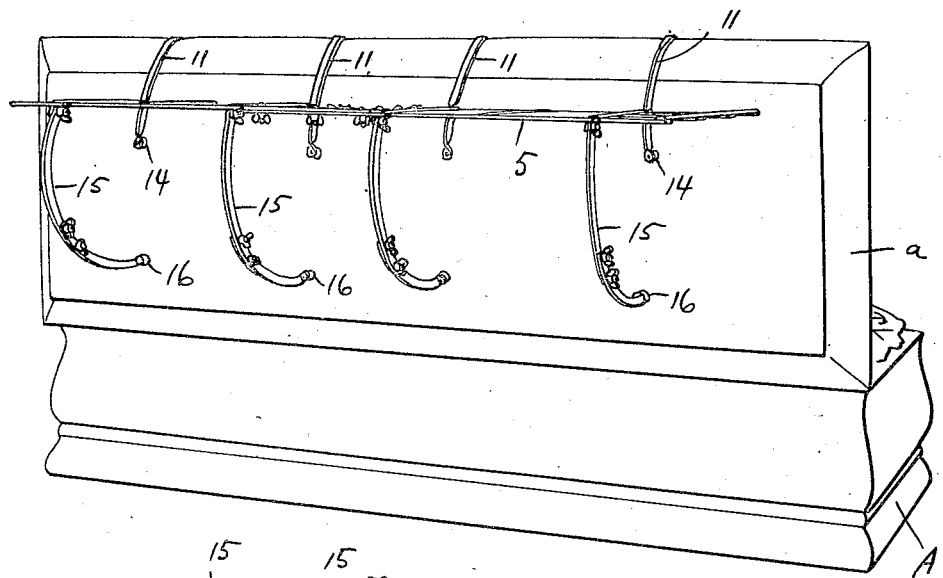
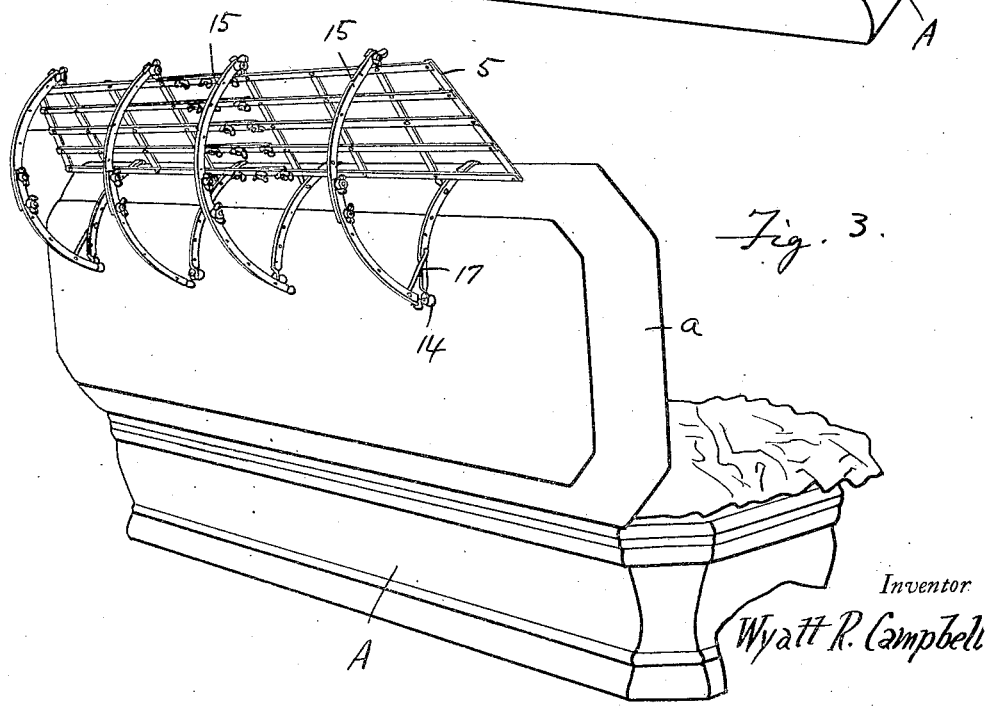

Patented Sept. 4, 1928.

1,683,526

UNITED STATES PATENT OFFICE.

WYATT R. CAMPBELL, OF NEW CASTLE, PENNSYLVANIA.

FLOWER-DISPLAYING DEVICE FOR COFFIN LIDS.

Application filed October 27, 1927. Serial No. 229,206.

This invention relates to new and useful improvements in supports and aims to provide a highly novel, simple and efficient device for association with the lids of coffins when in raised position for permitting flowers to be banked above and directly in back of the upper edge of the lid or to permit basket flowers to be supported in position directly in back of the upper edge of the lid, with the obvious result of permitting funeral displays, bouquets, baskets and the like to be disposed directly upon the coffin rather than upon chairs, tables or the like within the room wherein the coffin is disposed.

In carrying out my invention there is provided a relatively elongated supporting frame equipped with means whereby the same may be disposed upon the top of a coffin lid directly in back of the upper edge thereof when the lid is in raised position and wherein the frame may be arranged in horizontal position beneath the upper edge of the lid or in slightly raised inclined position for in the first instance supporting flower baskets and the like and in the second instance for permitting bouquets, sprays and the like to be banked upon the upper edge of the lid.

The invention further aims to provide a flower display device wherein the same is readily adjusted to permit of its use in association with caskets of various lengths.

In the drawings wherein like reference characters indicate corresponding parts throughout the several views:

Figure 1 is a perspective of my improved flower displaying device for coffins.

Figure 2 is a rear perspective of a coffin, the lid thereof being removed and being equipped with my improved device, the supporting frame being disclosed as in horizontal position so as to support baskets of flowers, and Figure 3 is a similar view disclosing the device so arranged that the same will be in inclined position throughout its transverse area to cooperate with the upper edge of the casket lid to permit flowers to be banked at the upper edge of the lid.

Now having particular reference to the drawing my novel invention consists of a frame 5 constructed of longitudinally and transversely extending metallic straps 6 and 7. The frame 5 is preferably in two sections, the inner ends of the longitudinal straps being provided with spaced openings so that the inner ends of the straps of the sections may be interconnected by bolt and nut fasteners 8, it being obvious that by reason of the plurality of openings, the length of the entire frame may be readily increased or diminished.

The opposite ends of certain ones of the transversely extending straps 7 of the frame 5 are extended beyond the outermost longitudinal straps 6 and are twisted a one-quarter turn to provide tongues 9—9 through which are bolt receiving openings. Pivoted to the tongues 9 at the inner edge of the frame 5 preferably by bolt and nut connections 10 are arcuate shaped straps 11, the outer ends of which are twisted a one-quarter degree, while the extreme outer ends thereof are bent downwardly to provide hooks 12 which hooks are adapted for engagement over the upper edge of the lid $a$ of the casket A, the turned over portions of these straps having engagement with the usual beveled edge of the lid to prevent cutting thereof. Furthermore all of said straps 11 between their twisted portions and their inner ends are provided with spaced openings to permit the same to be attached at predetermined points to the tongues 9 of the frame 5.

The inner ends of these straps 11 are also twisted as at 13 and provided at these ends with rubber bumpers 14 for engagement with the outer surface of the casket lid $a$, see Figures 2 and 3.

Adjustably pivotally secured to the tongues 9 at the outer edge of the frame 5 preferably by bolt and nut connections as indicated in Figure 1 are inwardly curved sectional straps 15 of greater length than the straps 11 and serving to brace the outer edge of the frame against the casket lid. The inner ends of these brace straps 15 are equipped with rubber bumpers 16 for engagement with the casket lid as clearly disclosed.

Obviously when the hook 12 of the inner straps 11 of the device are arranged over the upper edge of the coffin lid $a$ when the same is raised, as in Figures 2 and 3, and the bumpers 16 of the brace straps 15 engaged upon the lid adjacent the lower edge thereof the frame 5 will be supported in substantially horizontal position to provide a table whereby baskets of flowers and the like may be set thereon which can of course be viewed by those standing in front of the casket. However when it is desired to bank sprays, bouquets or the like at the upper edge of the casket lid the frame 5 is swung upwardly to the inclined position as indicated in Figure 3 whereupon the rubber bumpers 16 of the brace strap 15 will engage the lid directly adjacent the bumpers 14 of the straps 11. In this instance the adjacent ends of the straps 11 and 15 are interconnected by readily detachable rods 17 which will of course prevent the slippage of the brace straps 15 and the consequent dropping of the frame 5.

In view of the foregoing description when considered in conjunction with the accompanying drawings it will at once be apparent that I have provided a highly novel, simple and efficient means whereby flowers may be disposed directly upon the lid of a casket when the same is in raised position.

Even though I have herein shown and described the invention as consisting of certain detail structural elements it is nevertheless to be understood that some changes may be made therein without affecting the spirit and scope of the appended claims.

Having thus described the invention, what I claim as new is:—

1. In a flower support for casket lids, a frame unit, a plurality of metallic straps secured transversely on said frame unit, the ends of certain of the straps being twisted at right angles, elongated flat bars of arcuate shape, said bars being pivotally connected to said twisted ends of the strap and are twisted to right angles at their upper ends and are bent inwardly to provide hook portions for engagement over the elevated lid of a coffin, and means for supporting the opposite edge of the frame unit.

2. In a flower support for casket lids, a frame unit, a plurality of metallic straps secured transversely on said frame unit, the ends of certain of the straps being twisted at right angles, elongated flat bars of arcuate shape, said bars being pivotally connected to said twisted ends of the strap and are twisted to right angles at their upper ends and are bent inwardly to provide hook portions for engagement over the elevated lid of a coffin, and means for supporting the opposite edge of the frame unit, said means consisting in twisting the opposite ends of certain of the straps at right angles, and arcuate arms connected at their upper ends to said twisted strap ends, and buffer members at the lower ends of said arms for engagement against the coffin lid for maintaining the frame unit in the desired position.

In testimony whereof I affix my signature.

WYATT R. CAMPBELL.